United States Patent [19]

Tsuruoka et al.

[11] Patent Number: 4,909,702
[45] Date of Patent: Mar. 20, 1990

[54] DEVICE FOR AUTOMATICALLY PALLETIZING UPRIGHT AUTOMIBLE WHEELS

[75] Inventors: Kouichi Tsuruoka, Kawanishi; Takaaki Kannan, Suita; Jiro Suematu, Osaka, all of Japan

[73] Assignees: Kanai Sharin Kogyo Kabushiki Kaisha; Kabushiki Kaisha Kasho, both of Osaka, Japan

[21] Appl. No.: 196,810

[22] Filed: May 5, 1988

Related U.S. Application Data

[63] Continuation-in-part of Ser. No. 926,622, Nov. 4, 1986, abandoned.

[30] Foreign Application Priority Data

Nov. 8, 1985 [JP] Japan ............................ 60-251724

[51] Int. Cl.⁴ ............................................. B65G 57/22
[52] U.S. Cl. .................................. 414/789.5; 198/774; 414/790.1; 414/791.7; 414/792.5; 414/792.6; 414/792.9; 414/798.7
[58] Field of Search ...................... 198/468.8, 774 X; 414/42, 45, 57, 62, 63, 68, 70, 103, 108

[56] References Cited

U.S. PATENT DOCUMENTS

| | | | |
|---|---|---|---|
| 3,736,997 | 6/1973 | Bottorf | 198/774 X |
| 4,043,097 | 8/1977 | Ishida et al. | 414/42 X |
| 4,558,776 | 12/1985 | Lattion | 414/68 X |
| 4,632,633 | 12/1986 | Avery | 414/110 X |

FOREIGN PATENT DOCUMENTS 2417457 10/1979 France ................................ 414/42

Primary Examiner—Robert J. Spar
Assistant Examiner—Janice Krizek
Attorney, Agent, or Firm—Wenderoth, Lind & Ponack

[57] ABSTRACT

An automobile wheels automatic loading device according to the present invention provides full automation of pallet preparation and automobile wheels loading work; a lining up apparatus lines up automobile wheels in the specific number, an automobile wheels gripping apparatus for gripping and transferring lined up automobile wheels onto a pallet, an automobile wheels piling up and discharging apparatus for loading automobile wheels in many layers on a pallet through the medium of a skid and discharging them, a skid supplying apparatus for supplying and placing a skid onto automobile wheels and a pallet supplying apparatus for supplying a pallet onto the piling up stage.

6 Claims, 4 Drawing Sheets

DEVICE FOR AUTOMATICALLY PALLETIZING UPRIGHT AUTOMIBLE WHEELS

This application is a continuationin-part of now abandoned application Ser. No. 926,622, filed Nov. 4, 1986.

BACKGROUND OF THE INVENTION

1. Field of the invention:

This invention relates to an automatic device for automatically loading automobile wheels onto a pallet and lined up coaxially in a line.

2. Description of the prior art:

Conventionally, automobile wheels carried on a conveyor are loaded on a pallet by hand. However, loading of automobile wheels by hand involves a danger because automobile wheels are very heavy and this has raised a problem from the viewpoint of safety.

The present invention has been made to settle the above problem and has for its object to provide a device for loading automatically wheels onto a pallet and line up coaxially in a line.

SUMMARY OF THE INVENTION

The first aspect of the invention comprises a lining up apparatus whereby upright wheels on a wheels receiving table are transferred successively by a movable table parallel to the lengthwise direction of lining up bars so as to line up a plurality of wheels in an upright state on the bars and adjoining each other in the axial direction of the wheels. The wheels receiving table receives upright wheels one by one and is arranged movably on two rails. There are two parallel lining up bars, each arranged adjacent to said wheels receiving table and in series with said two rails, and having at one end portion thereof a wheel stopper which determines the position of a wheel by making the wheel on the wheels receiving table strike against the stopper. The movable table is arranged between the lining up bars and below the two rails and is movable vertically and horizontally parallel to the lengthwise direction of the lining up bars. A wheels gripping apparatus capable of lifting and moving all the aligned wheels together from the lining up bars comprises two gripping members which can be opened and shut. The gripping apparatus is movable vertically and horizontally, whereby the apparatus is movable from above the lining up bars to the position where wheels are loaded onto a pallet.

The second aspect of the invention comprises a wheels piling up and discharging apparatus for use with a lining up apparatus. The wheels piling up and discharging apparatus comprises a piling up stage for supporting pallets to be loaded which can go up and down by means of a lifter, and a transporting chain for moving a pallet loaded with wheels from the piling up stage to a discharging position. There is also a skid supplying apparatus for transferring and arranging a skid on top of a layer of wheels on a loaded pallet for loading the following layer of wheels thereon.

The third aspect of the invention comprises a skid supplying apparatus for use with a lining up apparatus. The skid supplying apparatus is for transferring and arranging a skid on a layer of wheels on a pallet for loading the following layer on wheels thereon. Also, a pallet stage which can go up and down for supplying empty pallets to the piling up stage is provided. There are two sets of pawls which are arranged rockably before and behind the pallet stage and lift up the upper empty pallets loaded on the pallet stage. A cooperating transporting chain transfers only the lowermost empty pallet to a roller conveyor. The roller conveyor then transfers a pallet from the transporting chain onto the piling up stage.

The pallet standing by on the roller conveyor of the pallet supplying apparatus is supplied onto the piling up stage by slanting the roller conveyor. When the pallet is supplied on the piling up stage, the lowermost empty pallet is discharged from the pallet stage and is put on the roller conveyor to be ready for the next supply.

When the pallet of the first step is fully loaded with automobile wheels, a skid is placed on the automobile wheels by a skid gripping device of the skid supplying apparatus and at the same time the piling up stage is lowered by the height corresponding to the height of automobile wheels on one step so as to keep the loading surface always at the proper level. This operation is repeated until the piling up stage goes down to the lowermost height. Then, the pallet on which automobile wheels are piled up is moved to the discharging position by the chain of the automobile wheels piling up and discharging apparatus.

An empty pallet which is standing by on the roller conveyor of the pallet supplying apparatus is supplied onto the piling up stage, which is then raised up to the proper height.

By repeating the above operations, automobile wheels are loaded automatically.

BRIEF DESCRIPTION OF THE DRAWINGS

The nature and advantage of the present invention will be understood more clearly from the following description made with reference to a preferred embodiment shown in the accompanying drawings, in which.

Figure 1A:
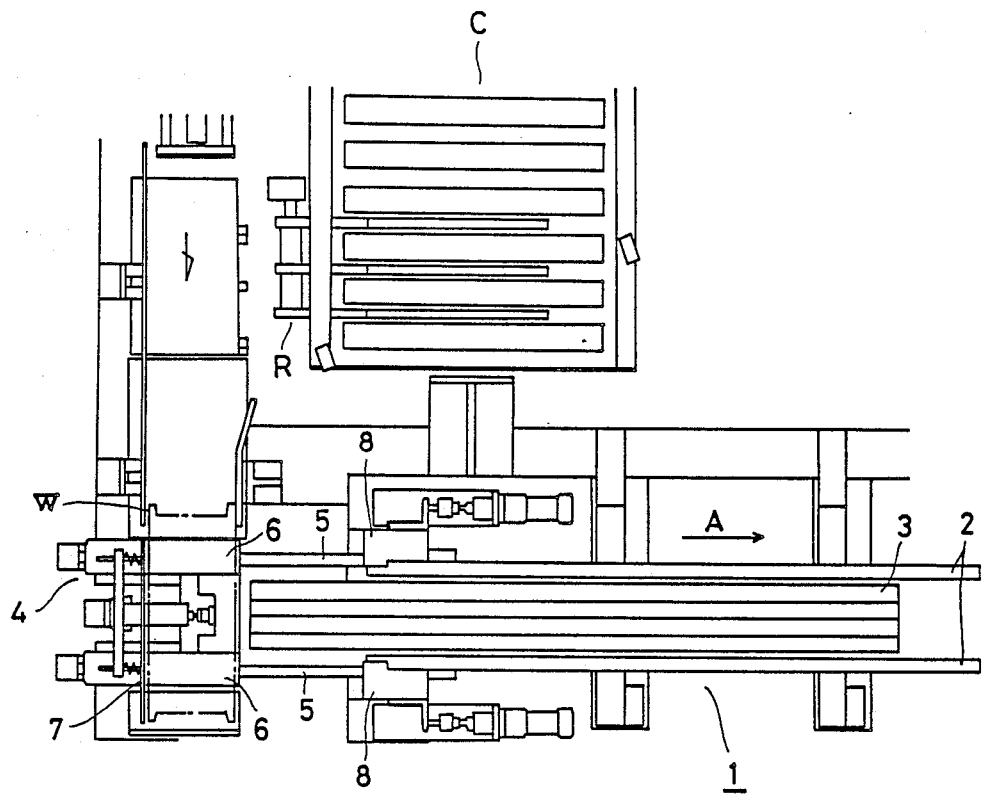
FIG. 1A is an explanatory drawing of the lining up apparatus.
Figure 1B:
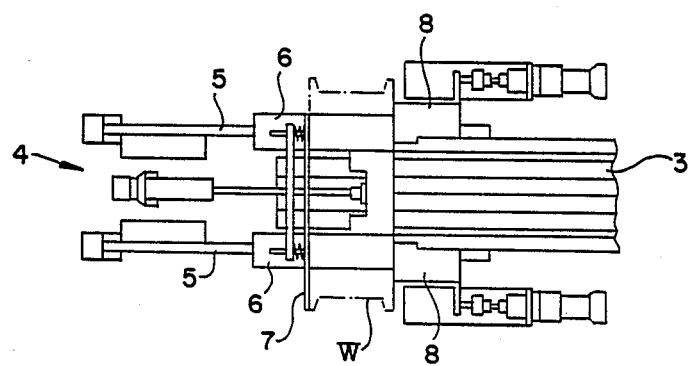
FIG. 1B is an enlarged partial view of the lining up apparatus of FIG. 1B showing the wheels receiving table 6 moved toward the movable table.

A PREFERRED EMBODIMENT:

As shown in FIG. 1, a lining up apparatus 1 is composed of two parallel lining up bars 2 for lining up automobile wheels, a movable transfer table 3 arranged between and below the lining up bars 2 and a transferring apparatus 4 at the entrance side of the lining up bars 2.

The transferring apparatus 4 is in parallel with the lining up bars 2 and is composed of two rails 5 between which the movable table 3 lies and a wheel receiving table 6 which is arranged movably on the two rails 5 and which receives thereon wheels carried from the preceding process in an upright state. A pusher 7 is provided at the automobile wheels receiving table 6 for determining the position of an automobile wheel. This pusher is adjustable according to the size of a wheel. Pusher 7 is spring-loaded as best seen in FIG. 1. Thus, pusher 7 comes fully into play when an upright wheel W, on wheel receiving table 6 and adjacent to pusher 7, hits wheel stopper 8 when wheel receiving table 6 has moved both pusher 7 and wheel W horizontally toward stopper 8 and lining up bars 2 until wheel W hits stopper 8. Spring-loaded pusher 7 helps absorb the impact of wheel W hitting stopper 8 and ensures that wheel W remains both upright and correctly positioned. Of course, wheel receiving table 6 is moved horizontally by means such as the unnumbered hydraulic cylinder attached thereto (as best seen in FIG. 1). It is expedient to locate the cylinder below the central part of automobile wheels receiving table 6, for example.

The movable transfer table 3 is arranged extending over almost the whole length of the lining up bar 2 and between the transferring apparatuses. The movable table 3 moves up and down from below the automobile wheels receiving table 6 up to almost the same level with the lining up bar 2 and also moves in lengthwise direction of the lining up bar 2 by the distance almost equivalent to the width of one automobile wheel. An automobile wheel stopper 8 which is movable right and left is provided at the end portion of the automobile wheels entrance side of the lining up bars 2.

Figure 2:
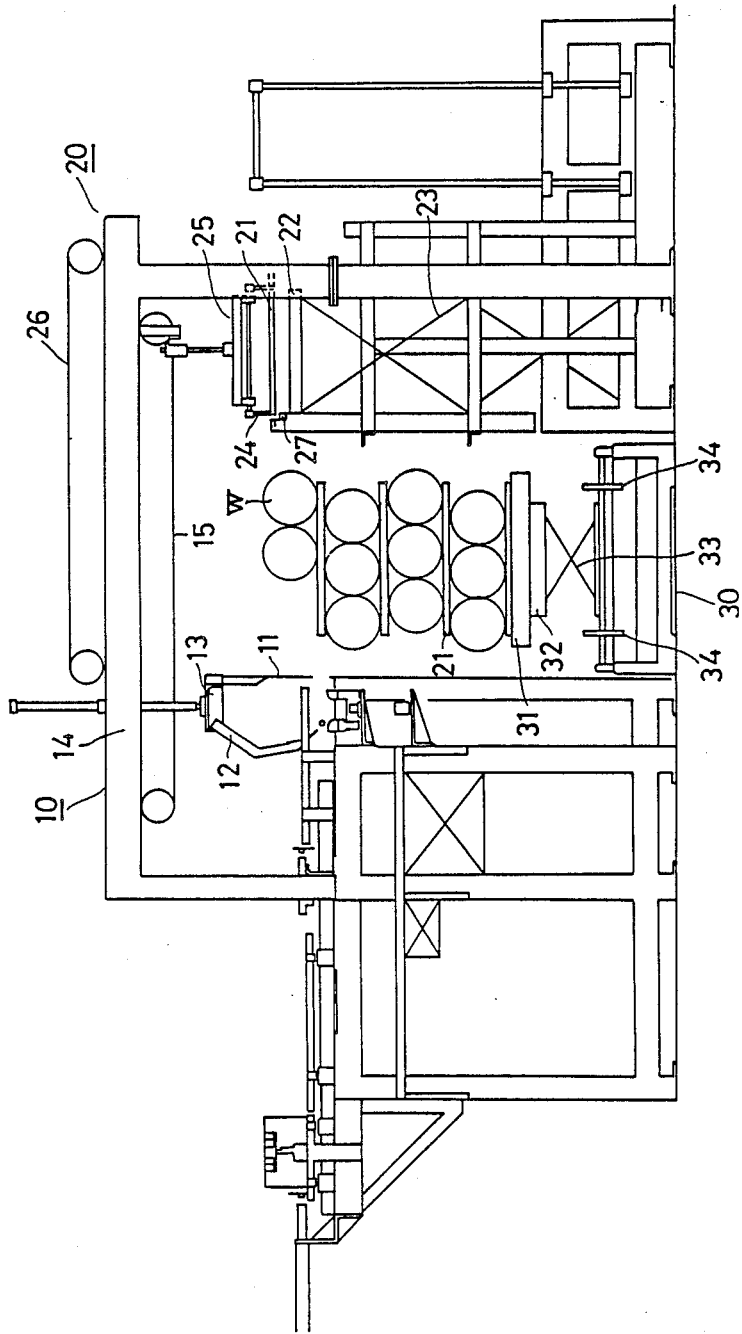
FIG. 2 is an explanatory drawing of the automobile wheels gripping apparatus and the skid supplying apparatus.

As shown in FIG. 2, a wheel gripping apparatus 10 can be opened and shut and has a gripping part 13 which can move vertically and horizontally. It is movable by a chain 15 on two rails 14 arranged at a right angle to the lining up bar 2, within the range from above the lining up bar to the position where wheels are loaded.

The gripping part 13 comprises gripping members 11, 12, one of which is fixed but the other is openable and shuttable, and the width therebetween is large enough to grip all wheels lined up on the lining up bars at a time. The gripping member 11 on the fixed side is linear in shape but the other gripping member 12 on the movable side is bent inwardly at its lower portion. However, both members can be bent inside at their lower portion and made swingable. It is also possible to line or coat the inside of the gripping members with rubber, resin or the like for the purpose of preventing slipping and thereby ensuring film gripping of the automobile wheels.

As shown in FIG. 2, a skid supplying apparatus 20 is composed of a skid stage 22 on which a skid 21 is loaded, a lifter 23 which raises and lowers the skid stage 22, a skid gripping device 25 carrying two sets of swingable pawls 24 to grip the skid 21 and a movable chain 26 for letting the skid gripping device 25 run on two rails 14 forward and backward. The skid 21 is a plate having a plurality of slits of a specific width and automobile wheels are rested on each slit.

The skid stage 22 is detected by a phototube 27 for its position so that the skid 21 is positioned at all times at the uppermost step. The skid stage 22 is moved upwardly by the lifter 23.

The skid gripping device 25 is guided and run on the rails 14 on which the gripping part 13 of the automobile wheels gripping apparatus 10 is guided and is so composed that is placed the skid 21 on automobile wheels loaded on a piling up stage 32.

Figure 3:
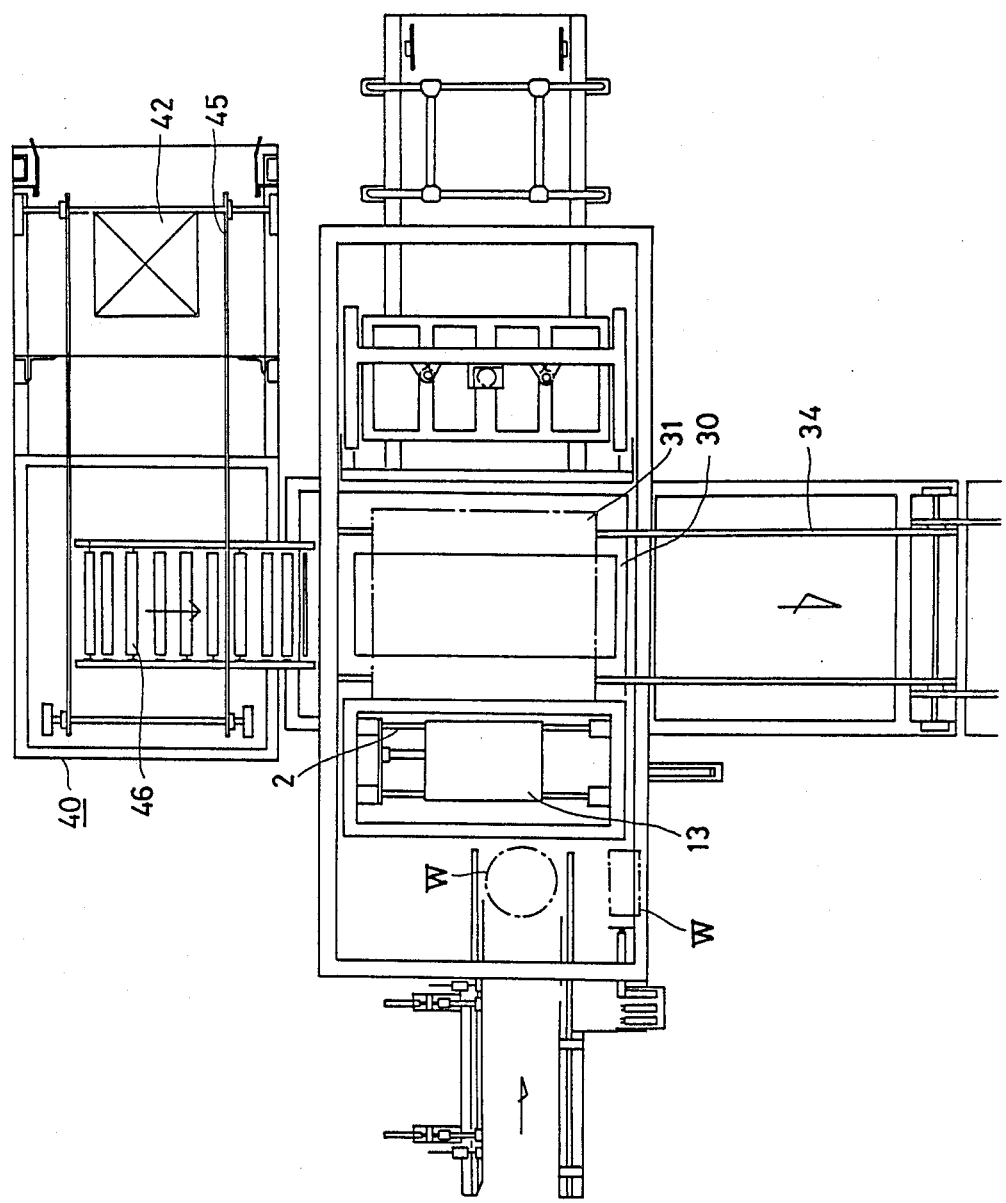
FIG. 3 and FIG. 4 are explanatory drawings of the pallet supplying apparatus.

An automobile wheels piling up and discharging apparatus 30, as shown in FIG. 2 and FIG. 3, is composed of the piling up stage 32 on which a pallet loaded with automobile wheels is placed, a lifter 33 which raises and lowers the piling up stage 32 and a loaded pallet transporting chain 34 which discharges the pallet 31 loaded with automobile wheels W from the piling up stage 32.

The lifter 33 is raised and lowered by a movable means and is so designed that at its lowermost position the upper surface of the piling up stage 32 comes below the level of the upper surface of the loaded pallet transporting chain 34.

The loaded pallet transporting chains 34 are arranged in such a fashion that the piling up stage 32 is sandwiched therebetween and moved in parallel with the lining up bars 2.

Figure 4:
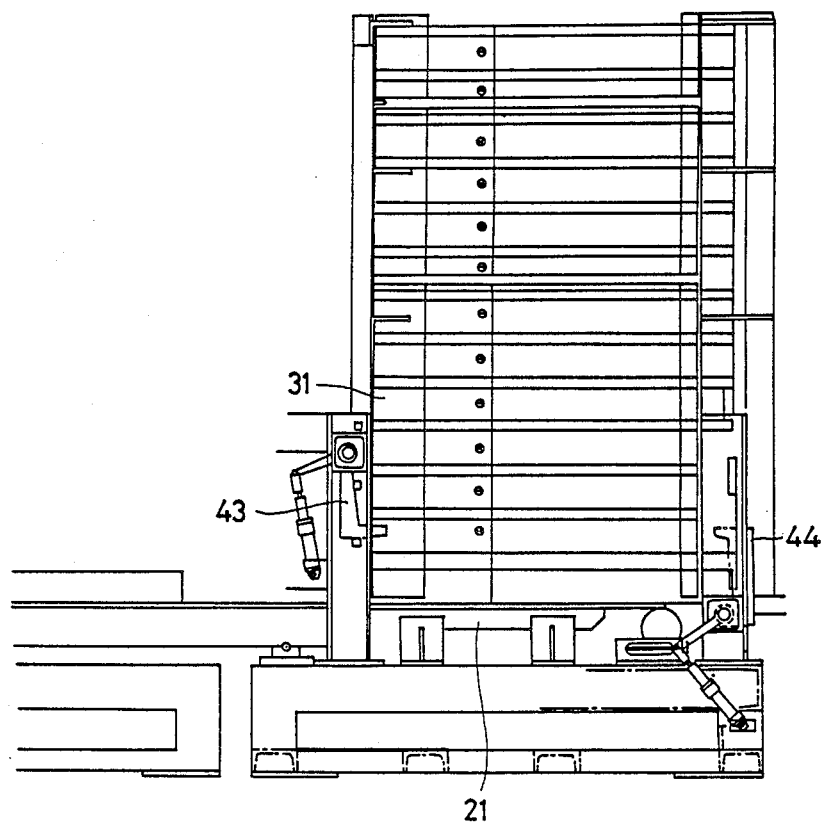

As shown in FIG. 3 and FIG. 4, a pallet supplying apparatus 40 is composed of two sets of pawls 43, 44 arranged swingably in front and in rear of the pallet stage 42 on which the pallet 31 is loaded, an empty pallet transporting chain 45 for transferring the pallet 31 to the side of the piling up stage 32 of the automobile wheels piling up and discharging apparatus 30 and a roller conveyor 46 for moving the pallet 31 onto the piling up stage 32.

The pallet stage 42 is moved up and down by a movable means. The uppermost point of the upper surface of the pallet stage is the position of the pallet 31 which is lifted a little and the lowermost point of that is the position which is slightly below the upper surface of the empty pallet transporting chain 45.

The empty pallet transporting chains 45 are arranged with the pallet stage 42 therebetween and moved in a direction at right angles to the lining up bars 2. A roller conveyor 46 is arranged on the opposite side of the pallet stage 42 of the transporting chain 45 and is movable up and down between the transporting chains 45 and the piling up stage 32.

Two sets of pawls 43, 44 are arranged in front and in rear relative to the moving direction of the chain 45. While the pawl 43 on the side of sending out the pallet 31 swings with its upper portion as a fulcrum, the pawl 44 on the side of receiving the pallet 31 swings with its lower portion as a fulcrum.

As a means of moving lifters 23, 33, the pallet stage 42, etc., a hydraulic apparatus, an air pressure apparatus, an electronic motor, a pulse motor, a servomotor and the like are available.

A description is made below about the action of the automobile wheels automatic loading device according to the present invention.

The empty pallet 31 (the skid 21 is fixed beforehand) standing by on the roller conveyor 46 of the pallet supplying apparatus 40 is supplied to the piling up stage 32 by slanting the roller conveyor 46. The piling up stage 32 with the empty pallet 31 thereon is raised to its uppermost position by raising the lifter 33.

By an automobile wheels carrying-in conveyor C arranged at the entrance side of the automobile wheels receiving table 6 of the lining up apparatus 1, automobile wheels are carried in one by one from the preceding process as they are laid down. The carrying-in conveyor C is stopped as soon as the automobile wheel strikes against a stopper provided at the terminal end of the carrying-in conveyor and intercepts the phototube 27. Then, the automobile wheel is set upright by revolving a pawl of an automobile wheels raising up device R by 90° and is pushed out by a pushing machine.

Wheels W pushed out in the above way are placed in an upright state on the wheels receiving table 6 of the transferring apparatus 4. The wheels receiving table 6 which received wheels W thereon moves on the rails 5 up to the position of the stopper 8 and stops there. Then, a wheel W is pressed against the stopper 8 by the spring action of the pusher 7.

It should be clear from the above that wheels receiving table 6 moves both pusher 7 and upright wheel W horizontally. When upright wheel W strikes stopper 8, spring-loaded pusher 7 helps absorb the impact thereof, helps ensure that wheel W remains upright, and helps determine and maintain the proper positioning of wheel W owing to the adjustability of pusher 7 for different widths of wheels and owing to pusher 7 contacting (at least in part) wheel receiving table 6 through the medium of springs.

Then, the movable table 3 is raised to receive the automobile wheels W from the automobile wheels receiving table 6 and moves the wheels W laterally in the direction of arrow A by the distance corresponding to the width of one wheel. When the movable table 3 has moved by the length corresponding to one automobile wheel, it is lowered and the automobile wheels are loaded on the lining up bars 2. As soon as these operations are finished, the pawls, the pushing machine, the automobile wheels receiving table 6, and the movable table 3 return to their original position.

Then, the carrying-in conveyor C again moves and stops upon the automobile wheel striking against the stopper, and the automobile wheel is placed on the automobile wheels receiving table 6. The wheels receiving table 6 moves to the position of stopper 8 and wheel W is pressed against the stopper 8 by the spring action of pusher 7.

Or, from a different point of view, stopper 8 pushes upright wheel W against the spring-loaded pusher 7, by which wheel W is maintained upright and correctly positioned. Then, the movable table 3 is raised and receives the automobile wheel W from the automobile wheels receiving table 6. At the same time, the automobile wheels W already placed on the lining up bars 2 are also received by the movable table 3, which moves in the arrow A direction by the length corresponding to one automobile wheel and the automobile wheels W are lined up adjacent each other on the lining up bars 2 along their central axes.

By repeating the above operation, automobile wheels W are lined up on the lining up bars 2 in the required number in an upright state and adjacent each other along their central axes. Then, the gripping part 13 of the automobile wheels gripping apparatus 10 moves onto the lining up bars 2 and descends so as to clamp all the automobile wheels W arranged in a line at one time. Then, the gripping part 13 moves to the position above the pallet 31 on the piling up stage 32, and when it comes to the specified position on the pallet 31, the gripping part 13 descends to place all the wheels W on the pallet 31, and returns to its original position.

By repeating the lining up of automobile wheels W and shifting of them to the pallet 31, automobile wheels W are arranged in a specific line on the pallet 31 (in this embodiment, the case of three lines of wheels W is shown).

When the automobile wheels W in the specific number are placed on the first step of the pallet 31, the skid gripping device 25 of the skid supplying device 20 works, grips one skid 21 on the skid stage 22 by the pawl 24, raises up the skid 21, moves on the rails 14, stops above the piling up stage 32 and places the skid 21 on the automobile wheels of the first step. Then, the piling up stage 32 is lowered by the height equivalent to one layer of automobile wheels so as to keep the automobile wheel loading surface at the required height. After its hold of the skid 21 is released, the skid gripping device 25 returns to its original position. At the same time, the skid stage 22 is raised by the height corresponding to the thickness of one skid 21 by the lifter 23, ready for the next motion.

As described above, after the skid 21 is placed on the automobile wheels, lining up of automobile wheels on the lining up bars 2, transferring of automobile wheels from the lining up bars 2, and supplying of the skid are repeated.

If automobile wheels of the first layer and those of the second layer are placed on the same slit position, a flange of the upper automobile wheel protruding slightly from the slit strikes against a flange of the lower automobile wheel. Therefore, in the case where automobile wheels to be placed on the second layer are loaded, in order to prevent the flanges of wheels of adjacent layers from striking against each other, the gripping apparatus 13 is moved laterally to change the position where the wheels are loaded on the second layer from those of the first layer. When lining up wheels on the succeeding layer, loading may be effected at the same position as for the first layer.

As described above, automobile wheels are placed on the pallet 31 in regular succession and when the loading of automobile wheels in the specific number is finished, the piling up stage 32 descends to its lowermost position. Then, the transporting chain 34 is driven and the pallet 31 with automobile wheels thereon is moved to the discharging position; thereafter, the pallet 31 is shifted to a truck, a wagon or the like by a lift and is carried out.

The pallet 31 standing by at the pallet supplying apparatus 40 is moved and placed on the piling up stage 32. At this time, the pawls 43, 44 grip the pallet 31 which is second from the bottom and the pallet stage 42 lowers. The pallet 31 on the pallet stage 42 is transferred onto the roller conveyor 46 by the transporting chain 45. The pallet 31 transferred onto the roller conveyor is sent onto the piling up stage 32 by raising and slanting the roller conveyor and by the rotation of rollers. Then, the piling up stage 32 rises up to the specific position and thus preparation is completed.

Since the present invention is composed as described above, preparation of pallets and loading of automobile wheels are automated fully only by arranging the pallet, the skid and automobile wheels at the specific position, with the result of curtailment of working hours, improvement of safety and other merits.

What is claimed is:

1. A device for automatically loading automobile wheels onto a pallet comprising:

a lining up apparatus having a horizontally movable wheel receiving table for receiving and supporting single upright wheels oriented vertically on their edges, lining up bar means for receiving and holding a plurality of upright wheels, a vertically and horizontally movable transfer table disposed adjacent said wheel receiving table and below said lining up bar means for transferring an upright wheel from said wheel receiving table to said lining up bar means, and a wheel stopper disposed between said wheel receiving table and said lining up bar means for stopping an upright wheel supported on said wheel receiving table, said wheel receiving table being movable toward said movable transfer table, said movable transfer table being horizontally movable substantially the width of an upright wheel;

a horizontally and vertically movable wheel gripping apparatus adjacent said lining up apparatus for grabbing and moving a plurality of axially aligned upright wheels held on said lining up bar means from said bar means and moving the plurality of wheels to a position where wheels are loaded onto a pallet; and said wheel receiving table with an upright wheel thereon being movable horizontally for striking the wheel thereon against said stopper, said transfer table then being movable vertically for contacting and removing the wheel supported on said wheel receiving table, then moving horizontally substantially an upright wheel width and adjacent to said bar means, said transfer table then being movable vertically downwardly for transferring the wheel to said bar means, whereby upright wheels are successively axially lined up on said bar means for being collectively grabbed and moved up said gripping apparatus.

2. The device of claim 1, wherein said gripping apparatus comprises two gripping members which open and shut for gripping and releasing the plurality of axially aligned wheels.

3. The device of claim 1, further comprising:

a wheel piling up and discharging apparatus having a vertically movable piling up stage for supporting a pallet thereon; said gripping apparatus being movable for removing the plurality of axially aligned wheels from said bar means and placing the upright wheels onto a pallet maintaining their upright orientation.

4. The device of claim 3, further comprising:

a skid supplying apparatus for placing a skid on top of a layer of upright wheels on the pallet for receiving a next layer of upright wheels from said gripping apparatus; and a loaded pallet transporting chain means for moving a set of pallets loaded with upright wheels from said piling up stage to a discharge position.

5. The device of claim 4, further comprising:

a vertically movable pallet stage for supplying empty pallets onto said piling up stage, said pallet stage having two sets of pawls for lifting up upper ones of the empty pallets on said pallet stage;

an empty pallet transporting chain means for transferring the lowermost pallet of the empty pallets when said pawls lift up the upper ones of the empty pallets; and a roller conveyor means for transferring the empty pallet from said empty pallet transporting chain means onto said piling up stage.

6. The device of claim 1, wherein said lining up bar means comprises two parallel lining up bars.

* * * * *